United States Patent
Hall et al.

(10) Patent No.: US 12,333,286 B2
(45) Date of Patent: Jun. 17, 2025

(54) GRAPHICAL USER INTERFACE FOR REDUCING VULNERABILITIES ASSOCIATED WITH LEGACY SOFTWARE

(71) Applicant: Truist Bank, Charlotte, NC (US)

(72) Inventors: Kenneth Hall, Roswell, GA (US); Bobby Len Robins, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 177 days.

(21) Appl. No.: 17/839,599

(22) Filed: Jun. 14, 2022

(65) Prior Publication Data
US 2023/0401047 A1 Dec. 14, 2023

(51) Int. Cl.
*G06F 8/61* (2018.01)
*G06F 9/451* (2018.01)
*G06F 21/57* (2013.01)

(52) U.S. Cl.
CPC .............. *G06F 8/61* (2013.01); *G06F 9/451* (2018.02); *G06F 21/577* (2013.01); *G06F 2221/033* (2013.01)

(58) Field of Classification Search
CPC .......... G06F 8/61; G06F 9/451; G06F 21/577; G06F 2221/033
See application file for complete search history.

(56) References Cited

U.S. PATENT DOCUMENTS

| | | | |
|---|---|---|---|
| 11,354,105 B2* | 6/2022 | Siram | G06F 8/35 |
| 11,442,765 B1* | 9/2022 | Zhang | G06F 9/30145 |
| 2009/0326964 A1* | 12/2009 | Garg | G06F 21/10 707/E17.014 |
| 2010/0154027 A1* | 6/2010 | Sobel | G06F 21/552 726/1 |
| 2011/0131134 A1* | 6/2011 | Ferris | G06F 21/10 709/224 |
| 2012/0117558 A1* | 5/2012 | Futty | G06F 9/44505 717/176 |
| 2014/0330874 A1* | 11/2014 | Novak | G06F 16/176 707/827 |

(Continued)

OTHER PUBLICATIONS

Sundqvist, Albin. "Guidelines to Convert Legacy Applications into Docker Container Services." (2020). (Year: 2020).*

(Continued)

*Primary Examiner* — Bradley A Teets
*Assistant Examiner* — Joanne G Macasiano
(74) *Attorney, Agent, or Firm* — Kilpatrick Townsend & Stockton LLP; Michael A. Springs, Esq.

(57) ABSTRACT

One example described herein includes a system that can generate a graphical user interface indicating pieces of legacy software in a computer system. The graphical user interface can also include options corresponding to the pieces of legacy software. The system can receive a first selection of a first option corresponding to a first piece of legacy software identified in the graphical user interface. In response, the system can deploy the first piece of legacy software within a container in the computer system. The system can also receive a second selection of a second option corresponding to a second piece of legacy software identified in the graphical user interface. In response, the system can initiate a process for obtaining security support from an external support entity for the second piece of legacy software.

20 Claims, 6 Drawing Sheets

(56) References Cited

U.S. PATENT DOCUMENTS

| | | | |
|---|---|---|---|
| 2016/0112497 A1* | 4/2016 | Koushik | G06Q 20/123 |
| | | | 715/739 |
| 2020/0034062 A1* | 1/2020 | Gill | G06F 3/0647 |
| 2020/0260287 A1* | 8/2020 | Hendel | G06N 5/04 |
| 2022/0398077 A1* | 12/2022 | Stopford | G06F 8/61 |
| 2023/0126168 A1* | 4/2023 | Birsan | G06F 9/45558 |
| | | | 718/1 |

OTHER PUBLICATIONS

Watada, Junzo, et al. "Emerging trends, techniques and open issues of containerization: A review." IEEE Access 7 (2019): 152443-152472. (Year: 2019).*

* cited by examiner

GRAPHICAL USER INTERFACE FOR REDUCING VULNERABILITIES ASSOCIATED WITH LEGACY SOFTWARE

TECHNICAL FIELD

The present disclosure relates generally to graphical user interfaces and legacy software. More specifically, but not by way of limitation, this disclosure relates to a graphical user interface for reducing vulnerabilities associated with legacy software in a computer system.

BACKGROUND

Many computer systems include a hybrid of legacy software and current software. Legacy software can be any software that has become outdated (e.g., obsolete), for example because a newer version is available. One example of legacy software can be an outdated version of an operating system, such as Windows 95®. Another example of legacy software can be an outdated version of an application server or web server, such as Apache HTTP Server v1.3. Current software can be any software that is not legacy software, for example because it is the most recent version of the software. One example of current software can be the most recent version of Microsoft Windows®, which is presently Windows 11®. Another example of current software can be the most recent version of Apache HTTP Server, which is presently Apache HTTP Server 2.4. Over time, current software may become legacy software as new software versions are released by developers. Executing legacy software in a computer system can introduce attack vectors that can be exploited by malicious actors to comprise the security of the computer system.

DETAILED DESCRIPTION

Certain aspects and features of the present disclosure relate to a security engine designed to assist in managing legacy software in a computer system and reducing vulnerabilities associated with the legacy software. In particular, the security engine can communicate with nodes of the computer system to determine which software is executing on the nodes. The security engine can then determine which of the software is legacy software and generate a graphical user interface indicating the legacy software in the computer system. Examples of the legacy software can include an outdated operating system or an outdated application. A network administrator or another user can access the graphical user interface to monitor the legacy software in the computer system. Since current software can become outdated over time over time (e.g., as newer versions are released by developers), the graphical user interface can help the network administrator stay up-to-date about those changes and mitigate potential problems arising from executing outdated software as soon as possible. In some examples, the security engine can also automatically notify the network administrator when a piece of software running in the computer system has become outdated. Without the security engine, the network administrator may not even realize that they are running software that has become outdated, which can expose the computer system to vulnerabilities that may be taken advantage of by malicious actors. But by using the security engine, the network administrator can become aware of those issues sooner and mitigate potential vulnerabilities arising from executing legacy software.

In some examples, the graphical user interface can include options for containerizing some or all of the legacy software. Containerizing a piece of legacy software can involve deploying the piece of legacy software within a container in the computer system. A container can be a relatively isolated virtual environment within a computer system that may be deployed using a container engine, such as Docker®. Containers can be created by leveraging the resource isolation features (e.g., cgroups and namespaces) of the Linux Kernel. Deploying the legacy software inside containers can help isolate pieces of legacy software from one another, from other software in the computer system, and from external entities. This can improve security. For example, the legacy software may include Windows 95®, which is an outdated version of the Windows operating system. The security engine can receive a user selection of an option to deploy Windows 95® inside a container running on a newer platform, such as a current version of Red Hat Enterprise Linux® (RHEL). Containerizing the legacy software on top of RHEL may effectively isolate the Windows 95® operating system from the rest of the local network and external entities, which may prevent malicious actors from taking advantage of latent vulnerabilities in Windows 95®. Without this containerization, a malicious actor may be able to communicate with the Windows 95® operating system and issue malicious commands to exploit vulnerabilities therein.

In some examples, the graphical user interface can include options for obtaining security support for some or all of the legacy software from one or more external entities. A user can select one of the options to obtain access to security support for a corresponding piece of the legacy software. For example, the security engine can receive a user selection of an option to obtain an extended support license for Windows 95®. This may involve the security engine automatically communicating with Microsoft's servers to register for the extended support license, which may last for a predefined time duration. In this example, the extended support license may grant access to technical support services provided by Microsoft® to help patch bugs and deliver upgrades. By providing such options in the graphical user interface, the network administrator can quickly and easily obtain security support for their legacy software to avoid vulnerabilities and other problems. The graphical user interface can also track and display how many support licenses are currently active for each piece of legacy software and provide automatic notification and renewal mechanisms for support licenses approaching the expiration of their term. This can help prevent the security licenses from inadvertently lapsing, which could expose the computer system to security risks.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
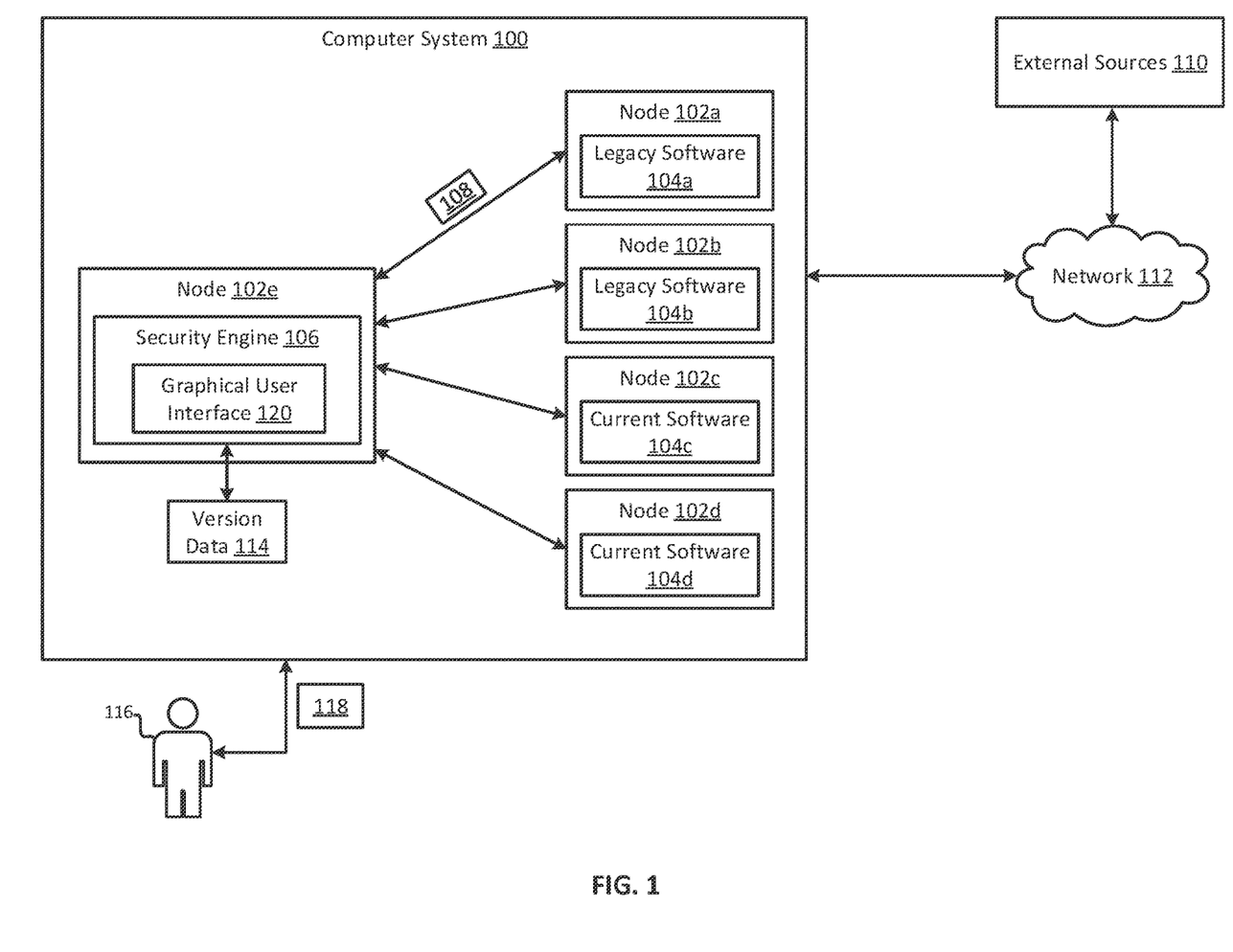
FIG. 1 shows a block diagram of an example of a computer system that includes legacy software according to some aspects of the present disclosure.

FIG. 1 shows a block diagram of an example of a computer system 100 according to some aspects of the present disclosure. The computer system 100 can include any number of nodes 102a-e. Examples of the nodes can include virtual machines and physical machines. The nodes 102a-e can execute software. Some of the software may be legacy software 104a-b and some of the software may be current software 104c-d. Over time, some of the current software 104c-d may become legacy software as new versions are released. It can be challenging to track the version status (e.g., as current or legacy) of each piece of software in a computer system 100 and take the appropriate steps to mitigate vulnerabilities arising from the legacy software, particularly where there are dozens or hundreds of pieces of software in the computer system 100.

Some examples of the present disclosure can overcome one or more of the abovementioned problems via a security engine 106. The security engine 106 can communicate with the nodes 102a-d and receive software information 108 indicating which software is running on each of the nodes 102a-d. The security engine 106 can collect this information and then determine which of the running software is outdated (e.g., legacy software). In some examples, the security engine 106 can determine which of the running software is outdated by comparing the running software's version to the most current version of each piece of running software. The most current version of each piece of software may be stored in version data 114 (e.g., a list or table) accessible to the security engine 106 for purposes of this comparison.

In some examples, the security engine 106 can generate the version data 114, which can specify the most current version of each piece of software running in the computer system 100. The security engine 106 may populate the version data 114 by automatically communicating with one or more external sources 110 via a network 112, such as the Internet. The external sources 110 can be any information sources outside of the computer system 100. Examples of such external sources can include webpages, such as Github pages, associated with each piece of software. The security engine 106 may periodically retrieve information from the external sources 110, for example at predefined intervals or in response to various triggering events, and update the version data 114 based on the information. One example of the information can include software release information. Additionally or alternatively, a user 116 such as a network administrator can help to populate the version data 114. For example, the user 116 can manually update the version data 114 to specify the most current version of one or more piece of software running in the computer system 100.

After identifying the legacy software 104a-b in the computer system 100, the security engine 106 can generate a graphical user interface 120 that is accessible to the user 116. The graphical user interface 120 can specify the legacy software in the computer system 100. Over time, the legacy software in the computer system 100 may change, for example as newer software versions are released and formerly current versions become outdated. The security engine 106 can detect such changes and notify the user 116 of the changes by updating the graphical user interface 120. Additionally, the security engine 106 can automatically notify the user 116 of the changes using other notification mechanisms. For example, the security engine 106 can store lists indicating the legacy software in the computer system 100 at different points in time. For instance, the security engine 106 can store a new list each day indicating the legacy software in the computer system 100 that day. The security engine 106 can then compare the lists to one another, for example at predefined intervals or in response to various triggering events. If the most recent list includes a piece of software that is absent from a prior list, the security engine 106 can automatically transmit a notification 118 to the user 116 about the change. For example, the security engine 106 can notify the user 116 via e-mail, text message, a voice call, or using some other notification method. If the user 116 is unaware that a piece of software running in the computer system 100 has become outdated, these automatic notifications 118 can help alert them of the issue. This can allow the user 116 to take appropriate action, for example to obtain a current version of the piece of software, to reduce security risk.

Figure 2:
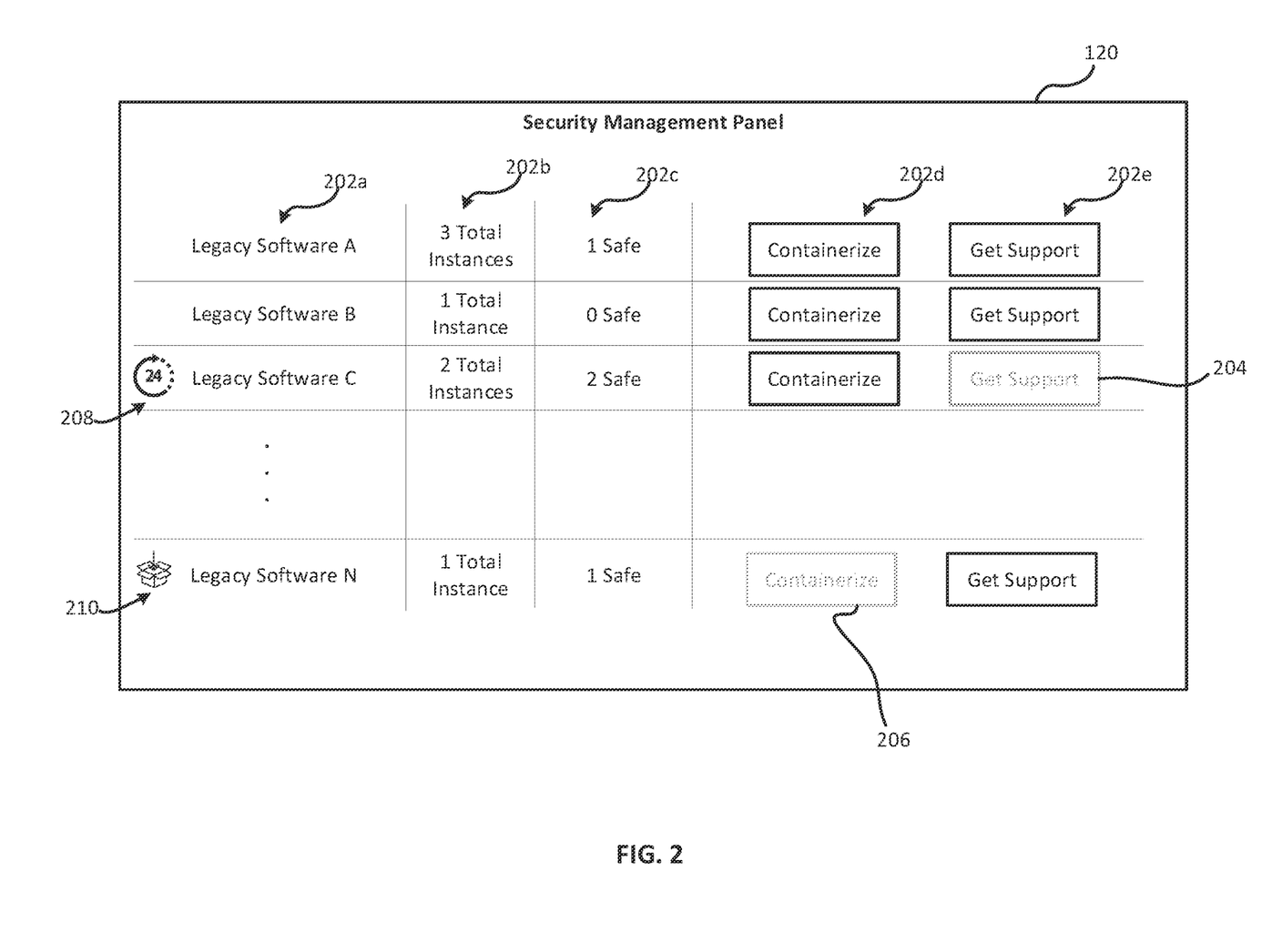
FIG. 2 shows an example of a graphical user interface for managing legacy software according to some aspects of the present disclosure.

One example of the graphical user interface 120 is shown in FIG. 2. As shown, the graphical user interface 120 can indicate the legacy software 202a in the computer system. The graphical user interface 120 can also include the total number of instances 202b of each piece of legacy software that are running in the computer system. This may be important for obtaining security support from an external support entity because the user may need to purchase a separate support license for each instance of the legacy software that is running in the computer system. The graphical user interface 120 may further include safety indicators 202c for each piece of legacy software running in the computer system. A safety indicator can indicate how many instances of a piece of legacy software are considered to be safe. An instance can be considered safe it has been containerized or if a security support service is active for that instance (e.g., if a support license has been obtained for that instance). In this example, only one of the three instances of Legacy Software A has been marked as safe. None of the instances of Legacy Software B have been marked as safe. All of the instances of Legacy Software C have been marked as safe. And all of the instances of Legacy Software N have been marked safe.

The graphical user interface 120 can also include containerization options 202d for containerizing the legacy software. In this example the containerization options 202d include "Containerize" buttons, but in other examples they may be presented in any other suitable way using any suitable graphical objects. If a user selects one of the containerization options 202d, the security engine can automatically deploy one or more instances of the corresponding legacy software inside one or more containers in the computer system. This may involve the security engine communicating with a container engine, such as Docker®, to containerize the legacy software. The containers can be deployed on top of a platform (e.g., operating system) that may be relatively up-to-date, which can help to isolate the legacy software and reduce the number of vulnerabilities that can be exploited in relation to the legacy software by malicious actors. In addition to deploying the legacy software inside the containers, the security engine can shut down the non-containerized versions of the legacy software. For example, the security engine can command the nodes running the legacy software to shut down their non-containerized versions of the legacy software. In this way, the security engine can effectively migrate the legacy software from its origin node to a newer platform on another node, in an automated manner, to improve the security of the computer system.

In some examples, the graphical user interface 120 may prevent containerization of a particular piece of legacy software. For example, the security engine may determine that a particular piece of legacy software cannot or should not be deployed in a container. The security engine may make this determination for any suitable reason, for example because containerizing the particular piece of legacy would lead to an error or some other undesirable result. So, the security engine may can disable the containerization option 202d for that particular piece of legacy software. One example of this is shown for containerization option 206, which has been disabled for Legacy Software N to prevent containerization of Legacy Software N. Additionally or alternatively, the security engine may disable a containerization option 202d for another reason. For instance, the security engine can determine that the Legacy Software N is already deployed in a container (e.g., as a result of a previous containerization process implemented by the security engine). The security engine can make this determination by, for example, communicating with a node on which the Legacy Software N is executing to determine the context in which Legacy Software N is executing. In response to determining that Legacy Software N is already deployed in a container, the security engine may disable the containerization option 202d to prevent this functionality from being repeated.

The graphical user interface 120 can also include support options 202e for obtaining security support for the legacy software from one or more external sources. In this example the support options 202e include "Get Support" buttons, but in other examples they may be presented in any other suitable way using any suitable graphical objects. If a user selects one of the "Get Support" buttons, the security engine can automatically communicate with one or more external support entities to activate security support for one or more instances of the corresponding legacy software. For example, the security engine can transmit commands via a network to one or more external support entities to purchase support licenses (e.g., extended support licenses) for some or all of the instances of the corresponding piece of legacy software.

In some examples, the graphical user interface 120 may prevent the user from obtaining security support from an external support service for a particular piece of legacy software. For example, the security engine may determine that external security support is unavailable or would be too expensive for a particular piece of legacy software. In one such example, the user may input a cost threshold into the security engine. The security engine can then determine (e.g., by communicating with the external support service) a cost to obtain a single security license for a given piece of legacy software and compare it against the cost threshold to determine how many support licenses can be purchased within the cost threshold. If the security engine determines that the security support is unavailable or too expensive for a given piece of legacy software, it can disable the support option 202e for that particular piece of legacy software. One example of this is shown with respect to support option 204, which has been disabled for Legacy Software C. Additionally or alternatively, the security engine may disable a support option 202e for another reason. For instance, the security engine can determine that security support was already been obtained for Legacy Software C (e.g., as a result of a previous support acquisition process executed by the security engine). The security engine can make this determination by, for example, consulting a support license registry of the computer system. In response to determining that security support was already been obtained for Legacy Software C, the security engine can disable support option 202e to prevent this functionality from being repeated.

In some examples, the graphical user interface 120 can further include support status indicators 208. The support status indicators 208 can include any suitable type of graphical indicators, such as icons, text, images, or combinations thereof. A support status indicator 208 may be positioned adjacent to each piece of legacy software for which security support has been obtained. In some examples, the support status indicator 208 can further indicate how much time is remaining in a support period. In the example shown in FIG. 2, the support status indicator 208 is indicating that 24 days remain in a support period associated with a support license obtained for Legacy Software C. The support status indicator 208 can help a user track time remaining in support periods, so as to prevent an inadvertent lapse or gap period in security support. In some examples, if access to the security support is about to expire (e.g., if the current date is within a predefined time period from an expiration date for a support license), the security engine may automatically renew the security support and/or notify the user. This can also help prevent an inadvertent lapse or gap period in security support. The security engine can determine which legacy software has security support, and the amount of time remaining in the corresponding support periods, using any suitable technique. For example, the security engine may automatically track this information over time as security support is obtained and renewed using the features described herein. As another example, the security engine can determine this information by consulting a support license registry of the computer system.

In some examples, the graphical user interface 120 can additionally or alternatively include containerization indicators 210. The containerization indicators 210 can include any suitable type of graphical indicators, such as icons, text, images, or combinations thereof. A containerization indicator 210 can be positioned adjacent to each piece of legacy software that has already been containerized. The containerization indicators 210 can help the user quickly discern which pieces of legacy software have already been containerized and are therefore less vulnerable to attack. The security engine can determine which legacy software is containerized using any suitable technique. For example, the security engine may automatically track this information over time as legacy software is containerized using the features described herein. As another example, the security engine can determine this information by communicating with the nodes running the legacy software in the computer system to determine the context in which each piece of legacy software is running. By viewing the support status indicators 208 and the containerization indicators 210, a user may be able to quickly understand the vulnerability status of the various pieces of legacy software in the computer system.

One example of the containerization process described above is shown in FIG. 3. In this example, the computer system 100 has deployed the legacy software 104a-b inside containers 302a-b on nodes 102c-d. The computer system 100 has also shut down the instances of the legacy software that were previously running on nodes 102a-b (as shown in FIG. 1). In this way, the computer system 100 has effectively migrated the legacy software from their original nodes 102a-b to the new nodes 102c-d, on which the legacy software 104a-b runs inside the containers 302a-b.

Figure 3:
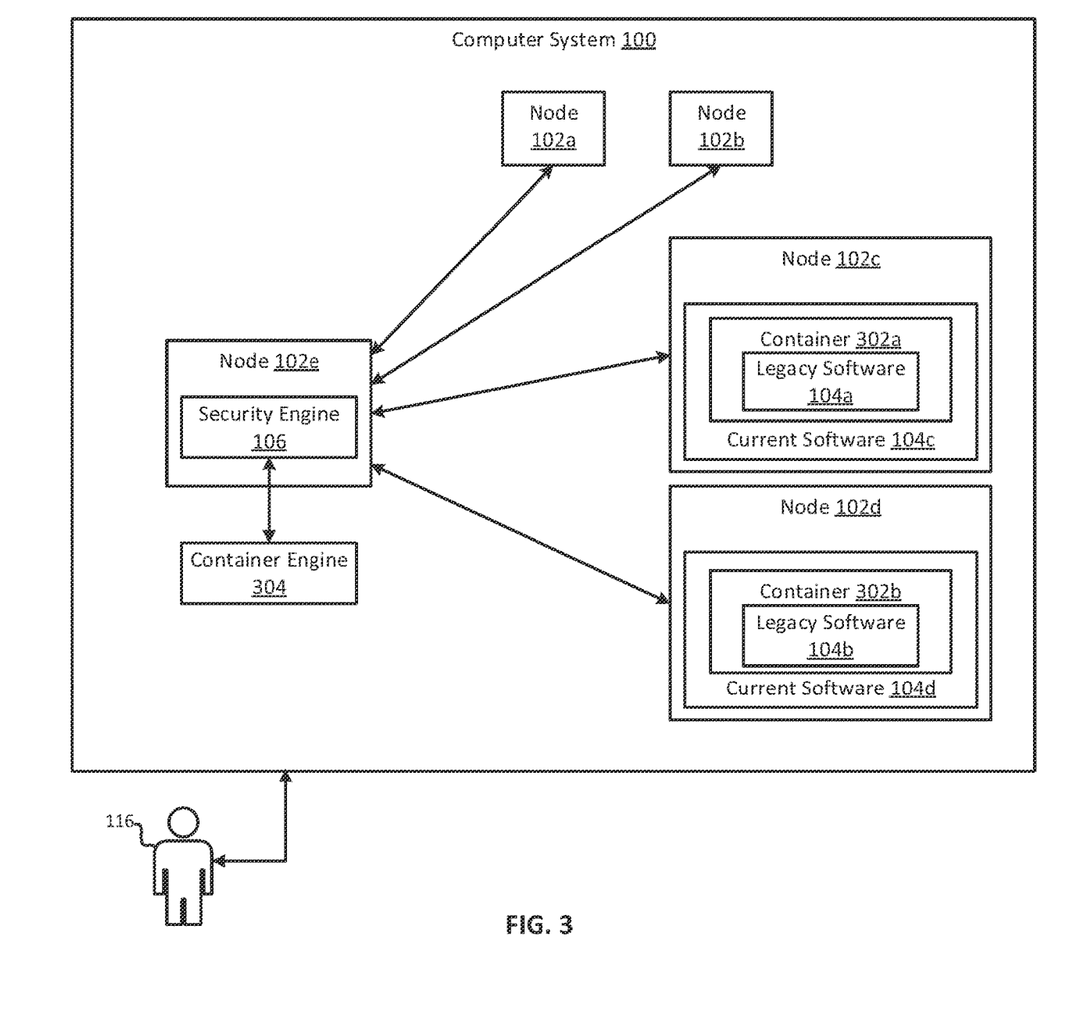
FIG. 3 shows a block diagram of an example of a computer system in which legacy software is deployed in containers according to some aspects of the present disclosure.

As one particular example, the nodes 102a-b may be executing a first operating system, such as Windows NT. The first operating system can be the host operating system of the nodes 102a-b. The first operating system may be installed on the nodes 102a-b for the purpose of executing an outdated application, which may only be capable of running properly on the first operating system. The first operating system may be legacy software 104a-b and have a number of vulnerabilities, so it may be undesirable to run the first operating system directly on the hardware of the nodes 102a-b. Conversely, nodes 102c-d may be executing a second operating system, such as the current version of Red Hat Enterprise Linux (RHEL). The second operating system can be the host operating system of the nodes 102c-d. The second operating system can be installed on the nodes 102c-d for the purpose of executing other applications in a more secure way. The second operating system can be current software 104c-d and may have significantly fewer vulnerabilities than the first operating system.

In the example arrangement described above, the security engine 106 can initiate a process to deploy the first operating system (OS) instances within containers 302a-b on top of the second OS instances running on nodes 102c-d. For example, the security engine 106 can communicate with a container engine 304 to perform this containerization. The container engine 304 may be part of, or separate from, the security engine 106. This containerization can effectively isolate the first OS instances such that they mostly communicate with the second OS instances, and may prevent or filter communications from external entities to the first OS instances. This can improve the security of the computer system 100. In some examples, the security engine may automatically implement this containerization process in response to detecting a user selection of a containerization option 202d in the graphical user interface 120.

One example of the support acquisition process described above is shown in FIG. 4. In this example, the computer system 100 has deployed legacy software 104a inside container 302a on node 102c. The computer system 100 has also shut down the instance of the legacy software that was previously running on node 102a (as shown in FIG. 1).

Figure 4:
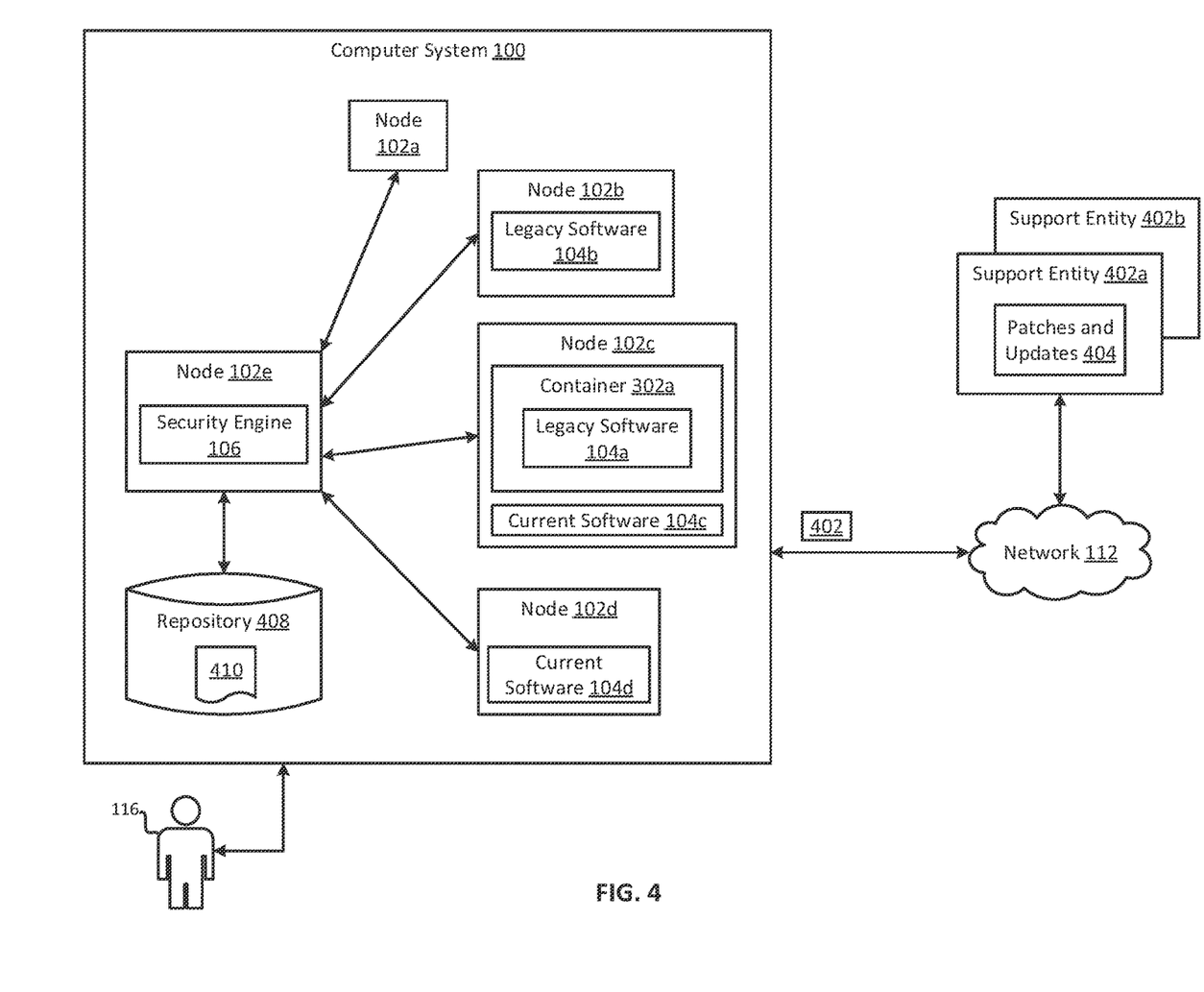
FIG. 4 shows a block diagram of an example of a computer system requesting support access from support entities according to some aspects of the present disclosure.

As noted above, the security engine 106 can detect user interactions with support options 202e in the graphical user interface 120. In response to the user interactions, the security engine 106 can obtain (e.g., automatically) access to security support for some or all of the instances of the corresponding legacy software 104a-b in the computer system 100. For example, the security engine 106 can transmit one or more communications 402 (e.g., requests) over the network 112 to one or more support entities 402a-b associated with a piece of legacy software 104a. The one or more communications 402 can be for acquiring a security support license or other authorization data 410 usable to obtain access to security support for the piece of legacy software 104a from the support entities 402a-b. In some examples, the support entities 402a-b can provide the security support for a predefined support term. The security support may be provided in the form of patches and updates 404 to the piece of legacy software 104a. The security engine 106 can store the authorization data 410 (e.g., security support license) in a repository 408, such as a support license registry, for subsequent use.

Figure 5:
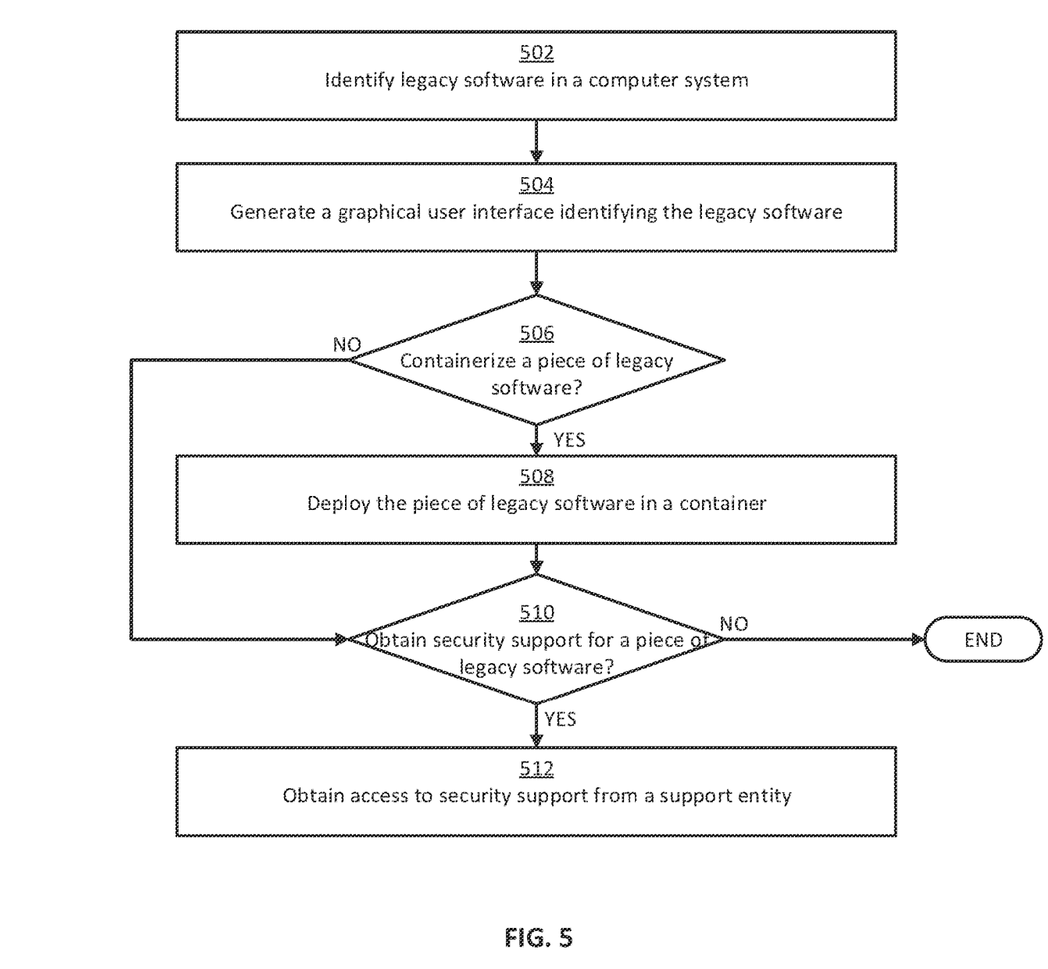
FIG. 5 shows an flow chart of an example of a process for reducing vulnerabilities associated with legacy software according to some aspects of the present disclosure.

FIG. 5 shows an flow chart of an example of a process for reducing vulnerabilities associated with legacy software according to some aspects of the present disclosure. Other examples may involve more steps, fewer steps, different steps, or a different order of steps than is shown in FIG. 5. The steps of FIG. 5 will now be described below with reference to the components of FIGS. 1-4 described above.

In block 502, the security engine 106 identifies legacy software 104a-b in a computer system 100. This may involve communicating with multiple nodes 102a-d of the computer system to determine software 104a-d running on the nodes 102a-d. After determining the software 104a-d running on the nodes 102a-d, the security engine 106 may then identify a subset of the software 104a-d as legacy software 104a-b. The security engine 106 can determine which pieces of the software 104a-d are legacy software 104a-b using version data 114, which may be automatically generated and/or manually generated by one or more entities.

In block 504, the security engine 106 generates a graphical user interface 120 identifying the legacy software 104a-b. For example, the security engine 106 can generate a graphical user interface that includes a list of software in the computer system 100, where the list includes the legacy software 104a-b and excludes the current software 104c-d.

The security engine 106 can provide the graphical user interface 120 to a user device of a user 116, such as a network administrator. Examples of the user device can include a laptop computer, desktop computer, mobile phone, tablet, or wearable device such as a smart watch. By interacting with the user device, the user 116 can provide input to the graphical user interface 120 and the computer system 100. The user 116 can view the graphical user interface 120 via a display of the user device.

In block 506, the security engine 106 determines whether to containerize a piece of legacy software 104a. For example, the security engine 106 can determine whether a containerization option 202d for a piece of legacy software 104a has been selected in the graphical user interface 120. If the security engine 106 determines that a piece of legacy software 104a is to be containerized, the process can proceed to block 508. Otherwise, the process can skip to block 510.

In block 508, the security engine 106 deploys the piece of legacy software 104a in a container 302a. For example, the security engine 106 can initiate the deployment process by communicating with a container engine 304, which in turn can effectuate the actual deployment in the container 302a. The container 302a can be deployed on the same node in which the piece of legacy software 104a is currently running or on another node. In some examples, the piece of legacy software 104a can be deployed in a container 302a on top of a platform that may be newer (e.g., less outdated) or less vulnerable than the piece of legacy software 104a. This may wrap or confine the more vulnerable piece of legacy software 104a within a less vulnerable operating environment.

In block 510, the security engine 106 determines whether to obtain security support for a piece of legacy software 104a. For example, the security engine 106 can determine whether a support option 202e for a piece of legacy software 104a has been selected in the graphical user interface 120. If the security engine 106 determines that security support is to be obtained for a piece of legacy software 104a, the process can proceed to block 512. Otherwise, the process can end.

In block 512, the security engine 106 obtains access to security support for the piece of legacy software 104a. For example, the security engine 106 can communicate with an external support entity 402a to register for an extended support license for the piece of legacy software 104a. This registration may be effectuated automatically via a network 112, for example by using predefined payment information input by the user 116 to the security engine 106.

Figure 6:
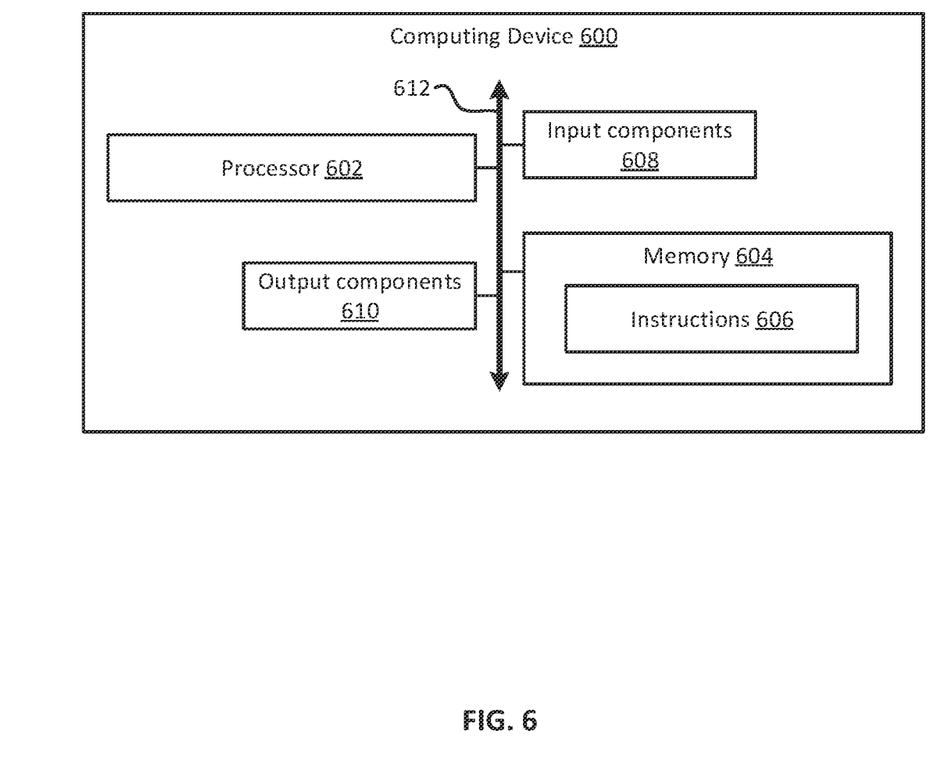
FIG. 6 shows a block diagram of an example of a computing device usable for implementing some aspects of the present disclosure.

FIG. 6 shows a block diagram of an example of a computing device 600 usable for implementing some aspects of the present disclosure. For example, the computing device 600 can correspond to the node 102e of FIG. 1 or the user device described above.

The computing device 600 includes a processor 602 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. Examples of such operations can include any of the functionality described above with respect to the security engine 106. In some examples, the instructions 606 can include processor-specific instructions generated by a compiler or an interpreter from code written in any suitable computer-programming language, such as C, C++, C#, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing device 600 may also include other input and output (I/O) components. The input components 608 can include a mouse, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A computing device comprising:
a processor; and
a memory that includes instructions executable by the processor for causing the processor to:
determine a plurality of pieces of legacy software in a computer system;
generate a graphical user interface listing the plurality of pieces of legacy software, the graphical user interface including a plurality of options corresponding to the plurality of pieces of legacy software, wherein the graphical user interface includes at least two respective options corresponding to each respective piece of legacy software in the plurality of pieces of legacy software, the at least two respective options including a first option for deploying the corresponding piece of legacy software in a respective container, and the at least two respective options including a second option for obtaining security support for the corresponding piece of legacy software, and wherein the graphical user interface includes a respective safety indicator corresponding to each respective piece of legacy software in the plurality of pieces of legacy software, the respective safety indicator being separate from the at least two respective options and indicating how many instances of the respective piece of legacy software in the computer system are considered safe according to a predefined criterion;
receive a first selection of the first option corresponding to a first piece of legacy software among the plurality of pieces of legacy software identified in the graphical user interface;
in response to receiving the first selection, deploy the first piece of legacy software within a container in the computer system;
receive a second selection of the second option corresponding to a second piece of legacy software among the plurality of pieces of legacy software identified in the graphical user interface; and
in response to receiving the second selection, initiate a process for obtaining security support from an external support entity for the second piece of legacy software, the external support entity being external to the computer system.

2. The computing device of claim 1, wherein the first piece of legacy software includes a first operating system, and wherein the memory further includes instructions that are executable by the processor for causing the processor to deploy the container on a second operating system that is different from the first operating system.

3. The computing device of claim 1, wherein the graphical user interface includes a graphical indicator corresponding to a piece of legacy software among the plurality of pieces of legacy software, the graphical indicator indicating whether the piece of legacy software is already deployed in a corresponding container.

4. The computing device of claim 1, wherein the graphical user interface includes a graphical indicator corresponding to a piece of legacy software among the plurality of pieces of legacy software, the graphical indicator indicating whether the computer system is already registered to receive security support for the piece of legacy software from a corresponding support entity.

5. The computing device of claim 4, wherein the graphical indicator indicates how much time is left in a support period for a support license corresponding to the piece of legacy software.

6. The computing device of claim 1, wherein the graphical user interface indicates how many instances of each piece of legacy software, in the plurality of pieces of legacy software, are present in the computer system.

7. The computing device of claim 1, wherein the memory further comprises instructions that are executable by the processor for causing the processor to:
   initiate the process by transmitting a request over a network to the external support entity, the request being configured for obtaining a support license for the second piece of legacy software from the external support entity.

8. The computing device of claim 1, wherein the memory further comprises instructions that are executable by the processor for causing the processor to:
   communicate with each node of a plurality of nodes in the computer system to obtain respective software information;
   receive the respective software information from each node of the plurality of nodes in the computer system, the respective software information for each node indicating which software is executing on the node; and
   identify the plurality of pieces of legacy software by comparing the respective software information received from each node to predefined version data.

9. The computing device of claim 1, wherein the first piece of legacy software is the same as the second piece of legacy software.

10. A method comprising:
    determining, by a processor of a computing device, a plurality of pieces of legacy software in a computer system;
    generating, by the processor, a graphical user interface listing the plurality of pieces of legacy software, the graphical user interface including a plurality of options corresponding to the plurality of pieces of legacy software, wherein the graphical user interface includes at least two respective options corresponding to each respective piece of legacy software in the plurality of pieces of legacy software, the at least two respective options including a first option for deploying the corresponding piece of legacy software in a respective container, and the at least two respective options including a second option for obtaining security support for the corresponding piece of legacy software, and wherein the graphical user interface includes a respective safety indicator corresponding to each respective piece of legacy software in the plurality of pieces of legacy software, the respective safety indicator being separate from the at least two respective options and indicating how many instances of the respective piece of legacy software in the computer system are considered safe according to a predefined criterion;
    receiving, by the processor of the computing device, a first selection of the first option corresponding to a first piece of legacy software among the plurality of pieces of legacy software identified in the graphical user interface;
    in response to receiving the first selection, deploying, by the processor of the computing device, the first piece of legacy software within a container in the computer system;
    receiving, by the processor of the computing device, a second selection of the second option corresponding to a second piece of legacy software among the plurality of pieces of legacy software identified in the graphical user interface; and
    in response to receiving the second selection, initiating, by the processor, a process for obtaining security support from an external support entity for the second piece of legacy software, the external support entity being external to the computer system.

11. The method of claim 10, wherein the graphical user interface includes a graphical indicator corresponding to a piece of legacy software among the plurality of pieces of legacy software, the graphical indicator indicating whether the piece of legacy software is already deployed in a corresponding container.

12. The method of claim 10, wherein the graphical user interface includes a graphical indicator corresponding to a piece of legacy software among the plurality of pieces of legacy software, the graphical indicator indicating whether the computer system is already registered to receive security support for the piece of legacy software from a corresponding support entity.

13. The method of claim 12, wherein the graphical indicator indicates how much time is left in a support period for a support license corresponding to the piece of legacy software.

14. The method of claim 10, further comprising initiating the process by transmitting a request over a network to the external support entity, the request being configured for obtaining a support license for the second piece of legacy software from the external support entity.

15. The method of claim 10, further comprising:
    communicating with each node of a plurality of nodes in the computer system to obtain respective software information;
    receiving the respective software information from each node of the plurality of nodes in the computer system, the respective software information for each node indicating which software is executing on the node; and
    identifying the plurality of pieces of legacy software by comparing the respective software information received from each node to predefined version data.

16. The method of claim 10, wherein the first piece of legacy software is different from the second piece of legacy software.

17. A non-transitory computer-readable medium comprising program code that is executable by a processor of a computing device for causing the computing device to:
    determine a plurality of pieces of legacy software in a computer system;
    generate a graphical user interface listing the plurality of pieces of legacy software, the graphical user interface including a plurality of options corresponding to the plurality of pieces of legacy software, wherein the graphical user interface includes a respective safety indicator corresponding to each respective piece of legacy software in the plurality of pieces of legacy software, the respective safety indicator being separate from the at plurality of options and indicating how many instances of the respective piece of legacy software in the computer system are considered safe according to a predefined criterion;
    receive a first selection of a first option, of the plurality of options, corresponding to a first piece of legacy software identified in the graphical user interface;

in response to receiving the first selection, deploy the first piece of legacy software within a container in the computer system;

receive a second selection of a second option, of the plurality of options, corresponding to a second piece of legacy software identified in the graphical user interface; and in response to receiving the second selection, initiate a process for obtaining security support from an external support entity for the second piece of legacy software, the external support entity being external to the computer system.

18. The non-transitory computer-readable medium of claim 17, wherein the graphical user interface includes:
  a first graphical indicator corresponding to a piece of legacy software among the plurality of pieces of legacy software, the first graphical indicator indicating whether the piece of legacy software is already deployed in a corresponding container; and
  a second graphical indicator corresponding to another piece of legacy software among the plurality of pieces of legacy software, the second graphical indicator indicating whether the computer system is already registered to receive security support for the other piece of legacy software from a corresponding support entity.

19. The non-transitory computer-readable medium of claim 17, further comprising program code that is executable by the processor for causing the computing device to:
  communicate with each node of a plurality of nodes in the computer system to obtain respective software information;
  receive the respective software information from each node of the plurality of nodes in the computer system, the respective software information for each node indicating which software is executing on the node; and
  identify the plurality of pieces of legacy software by comparing the respective software information received from each node to predefined version data.

20. The non-transitory computer-readable medium of claim 17, wherein an instance of the respective piece of software is considered safe if the instance has been containerized or if a security support service is active for the instance.

* * * * *